(No Model.) 4 Sheets—Sheet 1.

T. P. TAYLOR.
PERFORATING MACHINE.

No. 431,155. Patented July 1, 1890.

Witnesses.
Inventor.
Thomas P. Taylor
by his attorney
D. H. Hubbard (No Model.) 4 Sheets—Sheet 2.

T. P. TAYLOR.
PERFORATING MACHINE.

No. 431,155. Patented July 1, 1890.

(No Model.) 4 Sheets—Sheet 3.
T. P. TAYLOR.
PERFORATING MACHINE.
No. 431,155. Patented July 1, 1890.
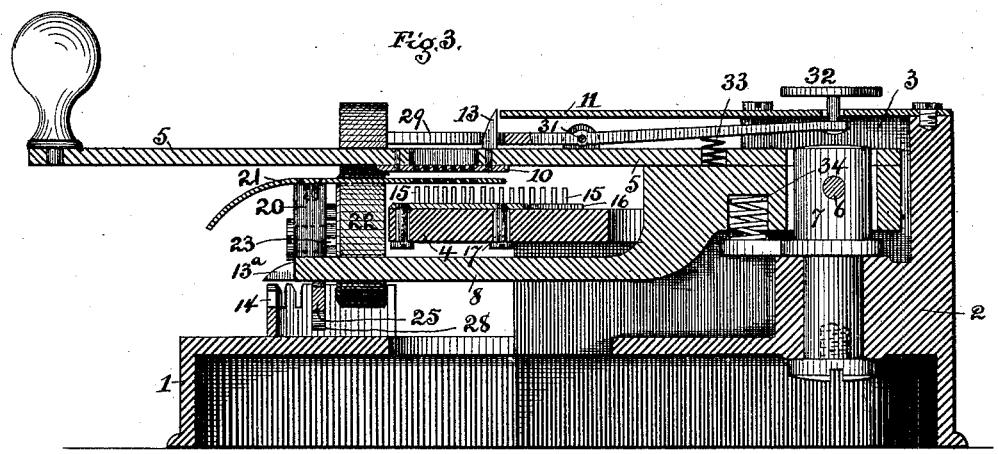
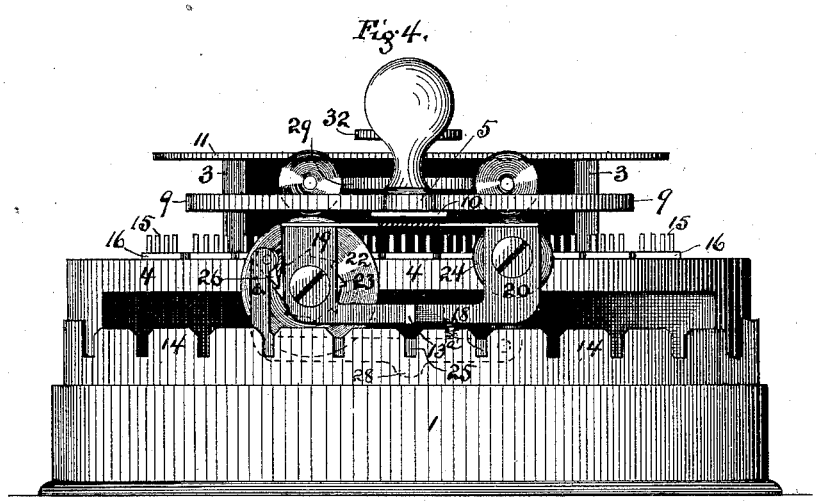
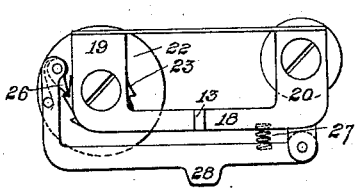
Witnesses.
Inventor.
Thomas P. Taylor
by his attorney
D. H. Hubbard (No Model.)  4 Sheets—Sheet 4.

T. P. TAYLOR.
PERFORATING MACHINE.

No. 431,155. Patented July 1, 1890.

Witnesses.
Ebn J. Tanner
A. J. Tanner

Inventor
Thomas P. Taylor
by his attorney
J. H. Hubbard

UNITED STATES PATENT OFFICE.

THOMAS P. TAYLOR, OF BRIDGEPORT, CONNECTICUT.

PERFORATING-MACHINE.

SPECIFICATION forming part of Letters Patent No. 431,155, dated July 1, 1890.

Application filed October 3, 1889. Serial No. 328,109. (No model.)

*To all whom it may concern:*

Be it known that I, THOMAS P. TAYLOR, a citizen of the United States, residing at Bridgeport, in the county of Fairfield and State of Connecticut, have invented certain new and useful Improvements in Perforating-Machines; and I do hereby declare the following to be a full, clear, and exact description of the invention, such as will enable others skilled in the art to which it appertains to make and use the same.

My invention relates to certain new and useful improvements in machines for perforating the paper of checks, drafts, bonds, certificates of stock, and the like, so that the amount for which the check or draft is drawn, or the bond issued, or the number of the bond, or the value or number of shares of the stock-certificate may appear upon the face thereof in such manner that fraudulent alteration may be rendered exceedingly difficult; and the object of my invention is to provide a machine which shall be simple and compact in its construction, easy and rapid in its operation, and in which the perforations indicating the amount may be cut in any desired part of the check—for instance, immediately over the signature or in line therewith—which will render impossible a method of raising checks, which I am informed has been practiced, and which consists in severing the paper longitudinally thereof and substituting for the top half a new section bearing the name of a different payee or increased amount, or both, and attaching said newly-made upper half to the original lower half, upon which the genuine signature appears.

With the ends hereinbefore cited in view my invention consists in the construction and combination of elements hereinafter fully to be set forth and particularly as embodied in the claims which form a part hereof.

In order that those skilled in the art to which my invention appertains may fully understand its construction and method of operation, I will describe the same in detail, reference being had to the accompanying drawings, which form a part of this specification, and in which—

Figure 1:
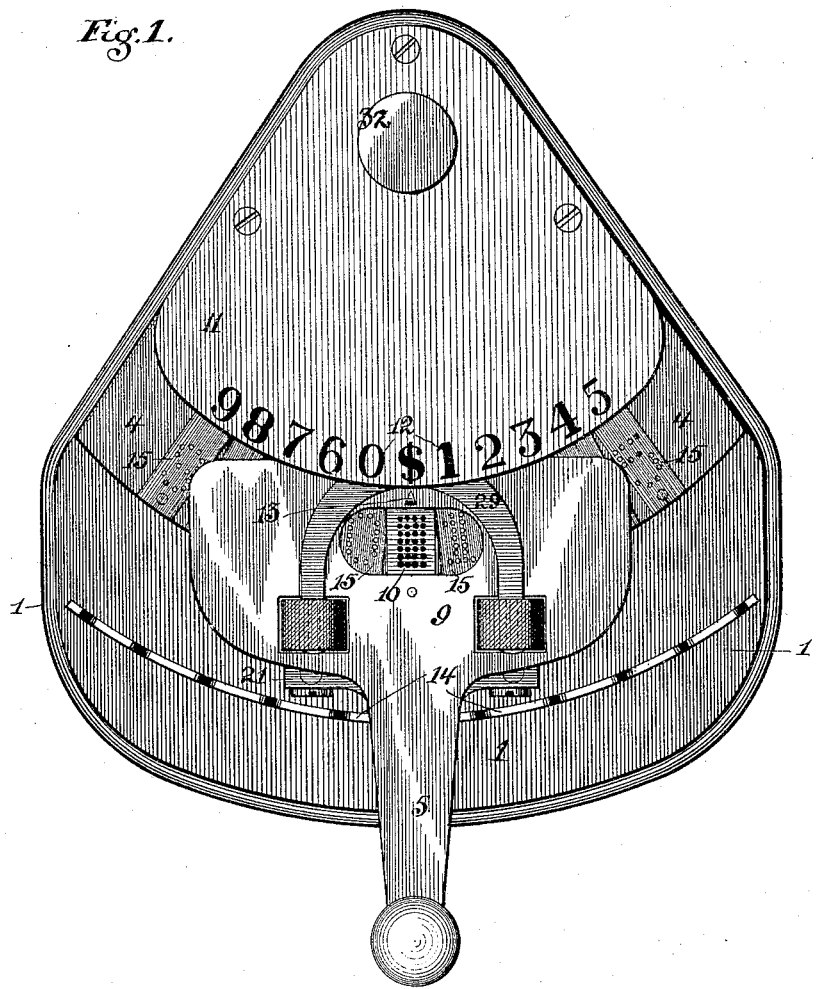
Figure 2:
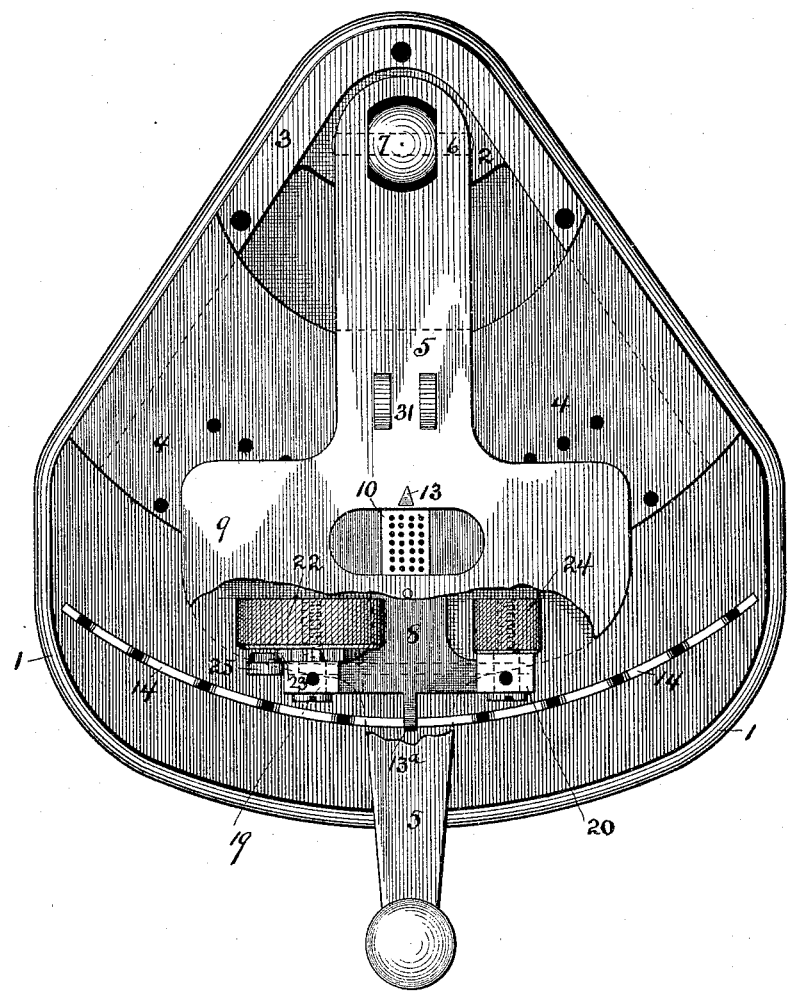
Figure 5:
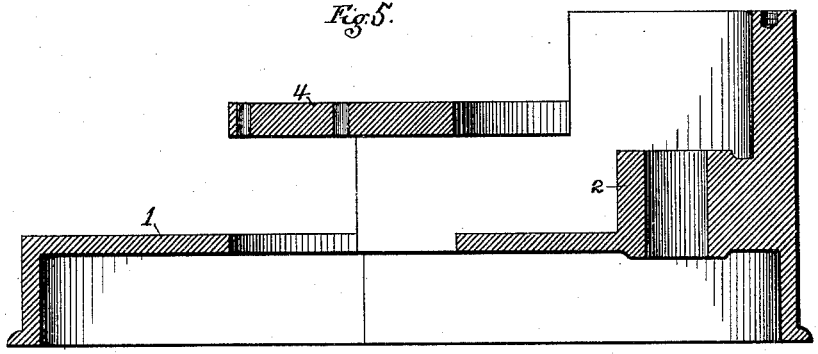
Figure 6:
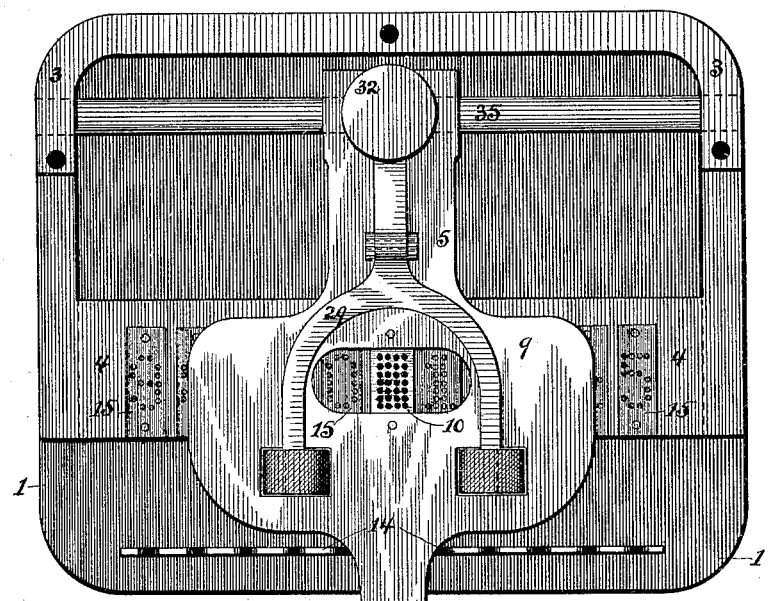

Figure 1 is a plan view of the complete machine; Fig. 2, a similar view, but with the cap-plate and dial removed; Fig. 3 a central vertical longitudinal section; Fig. 4, a front end elevation; Fig. 5, a detail section showing the base-casting stripped of the movable and attached parts; Fig. 6, a modification of the punch shown in the preceding figures; Fig. 7, a detail of the feed.

Like numerals denote the same parts in all the figures of the drawings.

1 is the base, which I prefer to make generally sectoral in shape with rounded corners, but which may be otherwise conformed, if desired. At its rear end it has a bracket 2, cast therein to provide a bearing for the lever-shaft, and from this end are extended outward raised ledges 3, on which the cap-plate is supported. Extending across the base-casting from side to side is the punch-bridge 4, upon which, as will hereinafter more fully appear, the perforating-punches are arranged.

5 is the die-operating lever, which at its rear end is journaled on a transverse pin 6, extending through said lever and the vertical shouldered shaft 7, whose upper portion is slabbed off, so that the lever may readily turn it on its axis, and may also have an independent vertical swinging movement on its pivot. Extending forward from its under side, just in front of its pivotal point, is an arm 8, which (see Fig. 3) projects under the punch-bridge, while the body of the lever is above said bridge. The purpose of this arm is to support the feeding devices in proper position relative to the check, as will hereinafter more fully appear. Near its central portion the operating-lever is enlarged to form a plate 9, beneath which the paper to be punched may be laid and in which the die 10 is set and carried. The die is made of a plate of steel having therein a considerable number of small perforations arranged in a regular rectangle and adapted to co-operate with all the punches of the series, the pins of each of which are arranged in the form of letters or figures, but with reference to each pin entering one of the holes in the die. At its outer end the operating-lever is provided with a handle, whereby it may be turned with the shaft to carry the paper to the required punch or to depress said lever to effect the punching operation.

11 is the cap-plate secured upon the ledges at the sides of the base and extending outward over the rear portion of the lever. Upon its forward edge it bears a dial or index 12, upon which appear the figures and other characters which the punch is intended to cut, said numbers on the dial being in line each with the punch whose character it represents.

13 is a pointer secured upon the operating-lever and which serves to indicate the relation of the die to the punch desired to be used.

Upon the outer end of the arm 8 is a guiding-tooth 13ª, which, as the lever is swung sidewise, moves over the top of a notched guide-rack 14, having a notch for each punch directly in line with the punch and the center on which the lever swings. The partitions between the notches are beveled at the top, so that when the lever is depressed on its pivot the tooth is guided into the notch, and thereby the accurate engagement of the die with the punch-pins is insured.

The bridge 4, heretofore described as carrying the punches, extends between the side walls of the base, and may be either cast with it or secured thereto in any suitable manner. The punches 15 are secured upon this bridge in a curved line drawn from the center of the pivot-shaft with a radius equal to the distance from said shaft to the die on the lever—that is, the die as carried by said lever moves directly over the line of punches. In placing the punches on the bridge I prefer, for purposes of assembly and of ready and accurate adjustment relative to the die with which they co-operate, to mount the pins of each punch upon a small block 16, having therein small threaded apertures, two or three in number. (See Fig. 3.) These holes correspond substantially in position with the openings 17, which extend through the bridge and which are somewhat larger than the threaded holes.

17 are screws having shanks somewhat smaller than the holes in the bridge and heads somewhat larger than said holes. This admits of the punch-block having a limited movement on the bridge after the screws are engaged with the block through the holes, but before they are tightened. It will be readily seen that to adjust the punch to the die it is only necessary to depress the latter, then move the punch until its pins enter the holes, and then while the parts are so engaged to tighten the screws, whose heads bind on the edges of the holes in the bridge and so hold the block and punch securely in proper position relative to the die.

In my device the check or other paper to be punched is fed forward after each punching operation, so as to present a new surface for the next punching operation in the following manner: Upon the end of the arm 8 is a transversely-extended frame consisting of the horizontal bar 18 and the pillars 19 20. (See Figs. 3 and 4.) On the tops of these pillars is a plate 21, which projects inward parallel with the face of the die and is perforated beneath the latter, either with one large opening, through which the whole punch may pass, or with a series of small holes corresponding to those in the die. This plate serves to support the check and also to strip the latter from the ends of the punch-pins after the perforating operation. The outer end of the plate is curved downwardly to facilitate the insertion of the check on top of it, as seen at Fig. 3. Upon the inner face of the pillar 19 is journaled a feed-wheel 22, having secured thereon a ratchet-wheel 23. The other pillar 20 carries a similarly-journaled wheel 24. 25 is an L-shaped lever, the end of whose longer arm is pivoted near the bottom end of the pillar 20, and whose shorter arm extends vertically upward and carries a pawl 26 in position to engage the ratchet of feed-wheel 22. The lever is normally held downward in the position shown by a spring 27, and a lug 28 extends downward from the bottom of said lever at a little distance from its pivotal point. Both the feed-wheels just described project slightly above the top surface of the stripper-plate through openings formed therein for that purpose, and they co-operate with a pair of upper feed-wheels journaled on the ends of a U-shaped frame 29, whose shank 30 is pivoted on the operating-lever, as at 31, and extending backward beneath the cap-plate has a button 32, projecting through said plate immediately over the shaft. These upper wheels pass through openings in the top of the lever, so as to engage the lower pair of wheels; but by the depression of the button 32 against spring 33 they may be raised out of their engagement. A spring 34 serves to raise the operating-lever upon its pivot after it has been depressed.

In the operation of my machine the upper feed-wheel frame and wheels are first raised by depressing the button, and then the check is inserted between the lower surface of the lever and the upper surface of the stripper-plate until that part of the check desired to be perforated comes beneath the die. The wheels are then allowed to return into their normal position, when the check is securely grasped by the two pairs of feed-wheels. The lever is then moved laterally until the pointer is opposite to the dial number or character desired to be produced and is then depressed. The guide-tooth entering the appropriate notch in the rack insures the proper relation between the punch and die, and as the latter and the paper are pressed downwardly the pins of the punch cut the holes in the paper. As the operating-lever is depressed the lug on the L-shaped feed-lever strikes the bed and said lever is raised against its spring, so as to cause the pawl to engage a new tooth on the ratchet-wheel, and as the operating-lever is returned upward the spring of the feed-lever depresses the latter and the pawl pulls the ratchet-wheel around one tooth. This advances the check one step relative to the die, and by a repetition of the punching movement any desired number of characters properly spaced each from that preceding may be punched in the paper.

In the drawings the proportions are shown as such that a check may be punched about an inch and a quarter from its top edge; but it will be readily understood that by lengthening the lever and arranging the dies in a circle with a longer radius from the lever-shaft the capacity of the machine to handle wide paper may be greatly increased without in any way altering the mechanical arrangement herein shown and described.

In this my invention I do not wish to be limited to the precise details of construction herein shown and described, since the same may be greatly varied without departing from the spirit and aim of my invention as set forth in the claims. For instance, in Fig. 6 I have illustrated a punch in which the method of operating on the check is the same as in the machine which forms the subject of the principal figures; but the construction is varied, so that, instead of obtaining the lateral movement of the lever and die by swinging the former about a center, I make the base substantially rectangular, arrange the punches in a straight row instead of upon an arc, and mount the lever upon a horizontal rod 35, on which it may be traversed longitudinally of the punch-row, and about which, as a pivotal point, it may be depressed to effect the cutting of the paper. This construction differs mechanically only from that heretofore described. The essential principle of the machine—namely, the plurality of punches and the movable single die—is in no wise altered.

I believe that I am the first to combine in a perforating-machine with suitable feeding mechanism a series of stationary punches representing different characters, and a single die movable both for selection and for the cutting operation and adapted to co-operate with each and every of said punches. This is one of the distinctive features of my invention, and my thirteenth claim is intend to cover it as far as possible within legal bounds.

I claim—

1. In a perforating-machine, the combination, with a set of punches stationary upon the bed, of a lever having lateral and vertical movement, a die common to all the punches secured on and carried by said lever, and suitable means for holding the check for presentation to the punches.

2. In a perforating-machine, the combination, with the base and a set of punches mounted thereon, of a lever having both lateral and vertical movement relative to the punches, a die carried by said lever and adapted to co-operate with either of the punches, and means carried by the lever for holding and feeding the check, substantially as set forth.

3. In a perforating-machine, the combination, with a base, of a set of fixed and upwardly-projecting punches secured thereon, a lever capable of movement lengthwise of the punch-row, and also a vertical swinging movement toward and away from the punches, a die adapted to the several punches and carried by the lever, and a set of grasping and feeding wheels moving with the lever and adapted to support the check in proper position between the die and the punch-row.

4. In a machine of the character described, the combination, with the base and a set of fixed punches mounted thereon, of a lever movable lengthwise of the punches and in a plane above their points, an arm secured to said lever and projecting outward beneath the punches, feeding-wheels mounted upon the arm, and complementary feed-wheels mounted on the lever and adapted to co-operate with the feed-wheels on the arm, substantially as specified.

5. In a perforating-machine, the combination, with the base, of the transversely-extended bridge having thereon the punches, the lever having therein a die and capable of traverse lengthwise of the punch-line, the arm secured to the lever and extended beneath the punch-bridge, the feed-wheels carried on said arm, and the complementary feed-wheels carried by the lever, substantially as specified.

6. In a perforating-machine, the combination, with the base, of the stationary punches mounted thereon, the operating-lever having thereon the die, the arm on said lever extending beneath the punches, and the check-supporting and stripper plate supported from the arm and extending inward between the die and punches, substantially as specified.

7. In a perforating-machine, the combination, with the base, of the punches mounted thereon, the die-carrying operating-lever having movement longitudinal of the punch-line, the arm extending from the lever outward beneath the punches, and means for guiding the downward movement of the arm, whereby the entry of the punch into the die is insured, substantially as set forth.

8. In a machine of the character described, the combination, with the base, the punches, and the laterally and vertically movable die-carrying lever, of the lever-arm projecting outward beneath the punches, the pillars on the end of said arm, and the stripper on the pillars, the feed-wheels journaled on the pillars and projecting upward through the stripper, the ratchet-wheel turning with one of the feed-wheels, and the pivoted L-shaped lever carrying a pawl whereby the feed-wheel is rotated, substantially as specified.

9. In a machine of the character described, the combination, with the base, the punches, and the die-carrying lever, of the feed-carrying arm extending outward beneath the punches, the lower feed-wheels carried by said arm, the pivoted frame carried upon the top of the lever and having journaled thereon the complementary feed-wheels, and means for raising the upper wheels for the insertion of the check, substantially as set forth.

10. In a perforating-machine, the combination, with the base, and the punches secured thereon and immovable relative thereto, of the lever capable of traverse relative to the punches and also vertically movable toward and away from them, the die carried by the lever, a pointer projecting from said lever, and a cap-plate extending outward over the rear end of the lever and having thereon a dial inscribed with characters corresponding to the punches, as set forth.

11. In a perforating-machine, the combination, with the base, of a bridge extending between the side walls thereof, a series of stationary and vertically-projecting punches mounted on said bridge, the operating-lever extending outward over the punch-bridge and punches and having lateral and vertical movement relative thereto, a die carried by said lever over the punches and into engagement therewith, the feed-carrying arm extended beneath the punch-bridge, and the feeding mechanism carried by said arm and the lever, substantially as set forth.

12. In a perforating-machine, the combination, with a series of punches each consisting of a plurality of projecting pins combined to form a character, of a lever capable of movement along the punch-line for purpose of selection, and capable also of vertical movement for the punching operation, and a die consisting of a plate having perforations adapted to engage and co-operate with the pins of the several punches, said die being secured on and carried by said lever, substantially as set forth.

13. In a perforating-machine, the combination, with the base, of a line of punches secured thereon, a lever movable over the line of punches for the purposes of selection, a die carried by said lever and capable of co-operation with each of the punches, and means for depressing the die into cutting engagement with the punch selected from the row, substantially as set forth.

In testimony whereof I affix my signature in presence of two witnesses.

THOMAS P. TAYLOR.

Witnesses:
S. H. HUBBARD,
M. C. HINCHCLIFFE.